March 29, 1960

C. H. STARLING 2,930,393

RATE OF FLOW CONTROLLER

Filed Jan. 31, 1955

United States Patent Office 2,930,393
Patented Mar. 29, 1960

2,930,393

RATE OF FLOW CONTROLLER

Charles H. Starling, Covington, Ga.

Application January 31, 1955, Serial No. 485,185

15 Claims. (Cl. 137—205)

This invention relates to a rate of flow controller, and more particularly to a vacuum-operated controller of this type.

It is an object of this invention to provide an improved controller for maintaining a predetermined rate of flow.

Another object is to provide a controller of this general type wherein a vacuum is utilized to raise the liquid to a predetermined elevation above a datum level fixed by a flow-measuring device, such as a weir, an orifice, a dam, or a venturi type flume, and the magnitude of the vacuum is varied to maintain the liquid at the predetermined elevation over the flow-measuring device.

Another object is to provide a simple and rugged controller with low space requirements which can be located on the operating floor of a filter plant.

Another object is to provide a rate of flow controller which can be readily made of acid-resistant material so that it can be used with acid liquids, such as the effluent of a hydrogen ion exchanger.

Another object is to provide a controller which may also be used as an integral part of a flow metering device.

Another object is to provide a controller which may be used for multiple functions, such as a single controller maintaining predetermined rates of flow for filtering and for filter washing.

Another object is to provide a controller which may be used to interrupt or totally stop flow without operation of the valves normally used for this purpose.

Another object is to provide a rate of flow controller which has few moving parts.

Other objects will become apparent upon consideration of the description and of the claims which follow.

The new rate of flow controller is particularly suited for controlling the effluent from a filter or a gravity ion exchange unit, though it is not limited to these specific applications but is useful wherever it is desired to maintain a predetermined flow rate despite variations in head or pressure upstream of the control device.

The invention will be more readily understood by reference to the drawings which form a part hereof and wherein.

Figure 1:
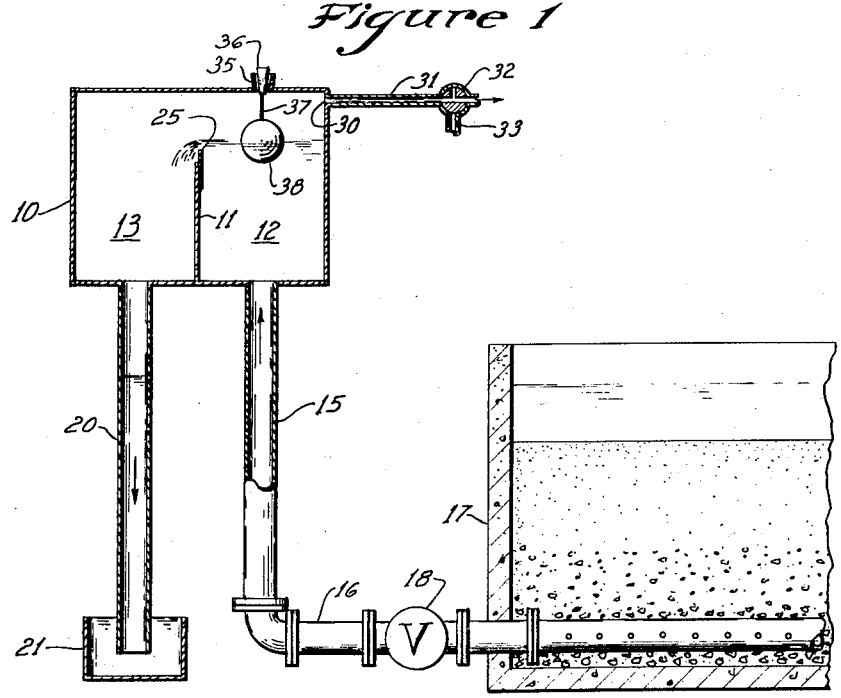
Figure 1 is a diagrammatical vertical sectional view of a controller according to the invention.

The controller shown in Figure 1 comprises a casing 10 divided by a partition 11 into an inlet compartment 12 and an effluent compartment 13. The inlet compartment is connected by a vertically extending riser pipe 15 to a conduit 16, which is shown for purposes of illustration as the effluent conduit leading from a filter 17 and is provided with a shut-off valve 18. A downtake pipe 20 leads from the outlet compartment 13 of the housing and has its lower end sealed in liquid in a trough or basin 21 of suitable size to prevent air from entering the housing through the downtake. The sealing trough 21 discharges to a clearwell or the like, not shown. The partition 11 is fitted with a weir 25, which preferably is of the straight-line type, such as, for example, a Sutro weir. Obviously, other flow-measuring devices, such as the orifice shown in Figure 4, or the venturi type flume shown in Figure 5, could be used instead of the weir 25.

The casing 10 has a vacuum port 30, which is connected by a line 31 to a vacuum-creating means, such as a vacuum pump or an ejector, not shown. The vacuum line 31 may be provided with a two-position valve 32, which connects the line 31 either to the source of vacuum or to atmosphere, through a vent 33. The casing 10 also has an air inlet port 35 provided with an air inlet valve 36 which is connected to the rod 37 of a float 38. Except for the air allowed to enter through port 35, the casing is of airtight construction. The valve 36, rod 37 and float 38 are so dimensioned that at equilibrium, when the liquid surface in the controller housing is at the predetermined elevation above the weir 25, corresponding to the predetermined flow rate, the air inlet valve 36 is open to such a degree that the air entering through it is exhausted by the vacuum pump or ejector as quickly as it enters. When the liquid surface rises above the predetermined elevation, the valve opening increases, and when the liquid surface falls below the predetermined elevation, the valve opening decreases.

When there is no flow through the controller, for example (when the controller is used in connection with a filter) during washing of the filter 17, the weight of the float 38 holds the air valve 36 completely closed. At the beginning of a new filter run the vacuum pump is started, and the effluent valve 18 opened. As the vacuum builds up in the housing 10, the water rises in pipe 15 and enters compartment 12 and continues to rise therein until it reaches the elevation where the float 38 is sufficiently submerged to be raised. Raising of the float opens the air inlet valve 36 to admit air to the housing 10. The water continues to rise and to raise the float until it has reached the predetermined elevation over the weir 25, at which time the float has opened the valve 36 to a degree where the incoming air satisfies the demand of the vacuum pump, and equilibrium is established. Since at the beginning of a filter run the loss of head through the filter 17 is at a minimum, the water level in casing 10 will tend to rise above the predetermined elevation. Immediately, however, the float 38 also rises, lifting the air inlet valve 36 so that more air can enter the casing 10, whereby the vacuum is reduced therein until the upstream head, plus the vacuum, again result in a force just sufficient to lift the liquid to the predetermined elevation. Similarly, as the filter 17 is becoming increasingly clogged toward the end of the run, the liquid surface in controller housing 10 will tend to drop, and the float 38 will move the valve 36 to a more closed position, so that less or no air enters through the port 35. Consequently, the vacuum in housing 10 will build up until the increased vacuum plus the decreased upstream head will again provide a force just sufficient to lift the liquid to the predetermined level, corresponding to the set flow rate.

When it is desired to interrupt the flow from filter 17 without manipulating the valve 18, the chamber 10 can be vented by turning the valve 32 in vacuum line 31 to the position where the connection with the source of vacuum is broken, and line 31 is connected to atmosphere.

Instead of a float, other liquid level responsive means may be used for positioning the valve 36. For example, the valve may be positioned by a reversible motor with contactors at different elevations in the housing 10. Such means are well known in the art and need not be shown or described in detail herein.

It will be obvious that a predetermined rate of filter washing can be maintained in the same manner as described for the rate of flow during filtering, and that a single controller can be used for controlling both the filtering and the washing rate. When the controller is used in connection with a gravity ion exchanger, predetermined rates of flow for normal use, washing, regeneration, and rinsing, can be maintained by a single controller.

Figure 2:
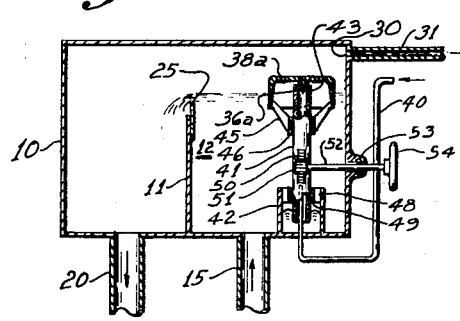
Figure 2 is a vertical sectional view of a modification of the controller of Figure 1.

In Figure 2 the casing 10, partition 11, weir 25, riser 15, downtake 20, vacuum port 30 and vacuum line 31 are the same as in Figure 1. In this embodiment of the invention, however, modified air inlet means are used and are combined with rate-setting means. An air inlet pipe 40 discharges within an open-ended tube 41 in the compartment 12. The lower end of the tube 41 is sealed in a mercury seal 42, and the upper end is shaped to form a valve seat 43. A valve 36a is carried on the underside of a hollow float body 38a, and may be integral therewith, as shown. The float 38a is guided by arms 45, which are affixed to a ring 46 slidingly encircling the tube 41. The tube 41 is slidably supported by arms 48 which extend from the mercury seal 42 and are affixed to a ring 49 encircling the tube 41. A rack 50 is affixed to the tube 41. A pinion 51 meshing with the rack 50 is affixed to the inner end of a shaft 52, which extends to outside the casing 10 through an airtight seal 53 and has a handwheel 54 affixed to its outer end. By rotating the handwheel 54 in either direction, the tube 41 can be raised or lowered to set a higher or lower flow rate, respectively, by establishing a higher or lower liquid level at which equilibrium takes place. The operation of this embodiment is the same as described in connection with Figure 1.

Figure 3:
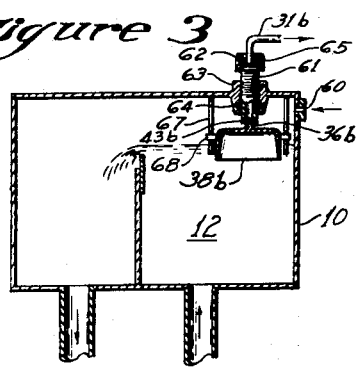
Figure 3 is a vertical sectional view of a modified embodiment of the invention.

While in the embodiments of Figures 1 and 2 the float-controlled valve controls the amount of air admitted to the casing 10, in the embodiment of Figure 3 the float-controlled valve is associated with the vacuum line. Air enters the casing 10 through an air orifice 60 in the wall of the casing. The inner end of the vacuum line 31b is surrounded by a tube 61, a suitable airtight seal 62 being provided between the pipe and the tube. The tube 61 extends into the casing 10 through an internally threaded bearing 63, and has its upper portion externally threaded. A suitable seal 64 between the lower portion of the tube 61 and the bearing 63 is provided. The lower end portion of the tube 61 is shaped to form a valve seat 43b. A collar 65 is affixed to the upper end of the tube 61 and holds the seal 62 in place. By turning the collar 65 in one direction or the other the tube 61 can be raised or lowered to raise or lower the liquid level at which equilibrium occurs.

A valve 36b is carried on the upper side of a hollow float member 38b or may be formed integral therewith, as shown. Guides 67 are provided and extend through ears 68 of the float to keep the valve 36b poperly centered with respect to its seat 43b.

In this embodiment, when the liquid surface is at the predetermined elevation corresponding to the flow rate set by positioning of the tube 61, the vacuum valve 36b will be open to a degree that the air entering through orifice 60 is exhausted as quickly as it enters. When due to an upstream increase in head the liquid surface in casing 10 rises above the predetermined elevation corresponding to the rate of flow for which the controller is set, the float 38b rises, and the valve 36b moves to more closed position, reducing the amount of air that can be exhausted until the reduced vacuum in chamber 12 plus the upstream head again are just sufficient to raise the liquid surface to the predetermined elevation. Conversely, when due to an upstream loss of head the liquid surface in casing 10 drops below the predetermined elevation, the float 38b moves the valve 36b further away from its seat, and the air entering through orifice 60 will no longer satisfy the demand of the vacuum-creating device. The vacuum, therefore, will build up in the casing 10 until the upstream head plus the vacuum is sufficient to raise the liquid surface again to the predetermined elevation.

Figure 4:
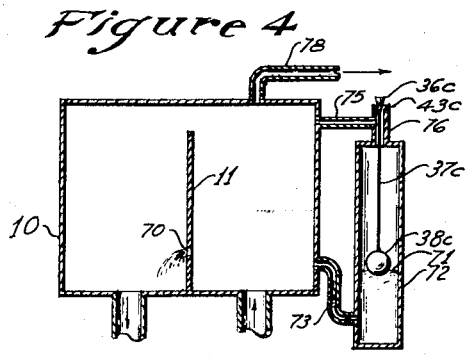
Figure 4 is a vertical sectional view of another modification of the controller of Figure 1.

In the modification of the controller shown in Figure 4, the flow-measuring device is shown for purposes of exemplification as an orifice 70 in the partition 11. Obviously, a measuring weir, as shown in Figures 1 to 3, or the venturi flume of Figure 5, could be used instead. In this embodiment of the invention the float 38c rides on mercury 71 in a container or well 72 outside the controller housing 10. To provide that the same pressures prevail in the container 72 above mercury 71 and in controller housing 10 above the liquid surface, the mercury holding part of the container 72 is connected to the housing 10 below the elevation of the orifice 70 by a conduit 73, and the part of the container 72 above the mercury is connected to the housing 10 above the maximum liquid level therein by conduits 75 and 76. The conduits 75 and 76 may be relatively wide to avoid friction losses therein.

The upper end of conduit 76 is formed as a valve seat 43c, with which a valve 36c, supported on rod 37c of float 38c, cooperates. Depending on the variations in the level of the mercury 71 in well 72, the valve 36c moves to more open or more closed positions to admit more or less air to the control system through conduits 76 and 75, as described in connection with Figures 1 and 2, or to exhaust more or less air from the system, as described in connection with Figure 3. Depending on whether air enters or is exhausted through conduits 76 and 75, line 78 will lead to a vacuum creating device or to atmosphere. This embodiment is particularly advantageous where the upstream head varies considerably, as it permits control by small float movements which reflect large variations of the liquid level in the controller casing.

Figure 5:
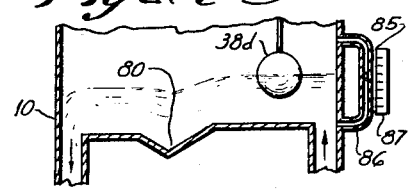
Figure 5 is a partial vertical sectional view of still another embodiment of the invention.

In the embodiment of Figure 5 the flow measuring device is shown as a venturi type flume 80 which leads from the inlet to the casing 10 to its outlet. In this embodiment the partition 11 can be omitted. A float 38d positions a valve, not shown, in accordance with the variations in the liquid level in the casing 10, as described in connection with Figure 1, to maintain a vacuum in casing 10, which together with the upstream head will provide a force just sufficient to lift the liquid to the predetermined level.

In this embodiment a rate of flow indicator 85 is shown. The indicator 85 comprises a transparent tube 86 connected to the casing 10 at elevations below and above the liquid level therein. The tube may be graduated, or, as shown, a properly calibrated scale 87 may be affixed to it. It will be obvious that the rate of flow indicator 85 can be used with all embodiments of the invention.

All embodiments of the invention provide a simple and exact controller which automatically maintains the set rate of flow of a liquid despite variations in the upstream head. When used to control the rate of flow of an acid liquid, the controller will be made of some acid-resistant material, such as a plastic of suitable strength.

I claim:

1. A rate of flow controller for maintaining a predetermined rate of flow despite variations in the upstream head comprising an airtight housing having a liquid inlet and a liquid outlet, said inlet being connected to a source of liquid under variable head, a flow measuring device in said housing interposed between said inlet and said outlet, said housing having a vacuum port through which air is exhausted from said housing and adapted to be connected to an extraneous source of vacuum, and an air inlet port through which air enters said housing, means responsive to variations in the liquid level in said housing, and a valve directly connected to and positionable relative to one of said ports by said liquid level responsive means, said valve controlling flow of air through said one port, and the other of said ports being constantly open.

2. The apparatus of claim 1, wherein said means responsive to variations in the liquid level in said housing are in said inlet compartment.

3. The apparatus of claim 1, including also a mercury well outside said housing, a first connection between the mercury holding portion of said well and a portion of said inlet compartment below the level of said flow measuring device, and a second connection between a portion of said mercury well above the mercury therein and a portion of said inlet compartment above the liquid surface therein, said means responsive to variations in the liquid level in said housing being in said mercury well, one of said ports being in said second connection, and said valve controlling flow of air through the port in said second connection.

4. The apparatus of claim 1, wherein said flow measuring device comprises a weir.

5. The apparatus of claim 1, wherein said flow measuring device comprises an orifice.

6. The apparatus of claim 1, wherein said flow measuring device comprises a venturi type flume.

7. The apparatus of claim 1, wherein said valve controls said air inlet port.

8. The apparatus of claim 1, wherein said valve controls said vacuum port.

9. The apparatus of claim 1, including also rate setting means.

10. The apparatus of claim 1, including also valve means positionable to connect said vacuum port to atmosphere.

11. A rate of flow controller comprising an airtight housing, a partition forming in said housing an inlet compartment and an outlet compartment, said partition being provided with a weir, said compartments communicating with one another above said weir, a conduit leading from a source of liquid under variable head connected to said inlet compartment, a liquid discharge conduit leading from said outlet compartment, said housing having a constantly open vacuum port through which air is exhausted from said housing and adapted to be connected to an extraneous source of vacuum, and an air inlet port, a float in said inlet compartment, and a valve directly connected to and positionable relative to said air inlet port by said float, whereby said valve controls flow of air through said air inlet port.

12. A rate of flow controller comprising an airtight housing, a partition forming in said housing an inlet compartment and an outlet compartment freely communicating with one another above said partition, said partition being provided with an orifice, an inlet pipe connected to said inlet compartment and leading from a source of variable head, a discharge conduit connected to said outlet compartment, said housing having a port, a mercury well outside said housing, a first connection between the mercury holding portion of said well and a portion of said inlet compartment below the level of said orifice, a second connection between a portion of said mercury well above the mercury therein and a portion of said inlet compartment above the liquid surface therein, a float riding on the mercury in said mercury well, said second connection having a port a valve directly connected to and positionable by said float with respect to said last mentioned port, one of said ports being connected to a source of vacuum and the other to atmosphere.

13. A rate of flow controller comprising an airtight housing having an inlet adapted to be connected to a source of variable head and an outlet, means forming a venturi type flume in said housing between said inlet and said outlet, said housing having a vacuum port adapted to be connected to a source of vacuum, and an air inlet port, a valve controlling flow of air through one of said ports, and a float directly connected to and positioning said valve with respect to said one port in accordance with variations in the liquid level in said housing.

14. A rate of flow controller comprising an airtight housing having an inlet connected to a source of variable head and an outlet, a flow measuring device in said housing interposed between said inlet and said outlet, said housing having a vacuum port adapted to be connected to a source of vacuum, an air line extending into said housing, a tube slidably supported in said housing and surrounding the outlet end of said air line, means for vertically adjusting said tube, means sealing the lower end of said tube in all positions of said tube, the upper end of said tube being shaped to form a valve seat, a valve adapted to be seated on said seat, and a float directly connected to and positioning said valve with respect to said seat in accordance with variations in the liquid level in said housing.

15. A rate of flow controller comprising an airtight housing having an inlet adapted to be connected to a source of variable head and an outlet, a flow measuring device in said housing interposed between said inlet and said outlet, said housing having an air orifice, a vacuum line extending into said housing, a tube slidably mounted on said housing and surrounding the outlet end of said vacuum line, means for vertically adjusting said tube, the lower end of said tube being shaped to form a valve seat, means for sealing the upper end of said tube in all positions of said tube, a valve adapted to be seated on said seat, and a float directly connected to and positioning said valve with respect to said seat in accordance with variations in the liquid level in said housing.

References Cited in the file of this patent

UNITED STATES PATENTS

| | | |
|---|---|---|
| 1,202,050 | Gamble | Oct. 24, 1916 |
| 1,636,626 | Corts-Standford | July 19, 1927 |
| 1,698,127 | Engstrand | Jan. 8, 1929 |
| 1,710,128 | Welch | Apr. 23, 1929 |
| 1,992,991 | Colley | Mar. 5, 1935 |
| 2,257,798 | Hill et al. | Oct. 7, 1941 |
| 2,528,642 | Cover | Nov. 7, 1950 |
| 2,745,426 | Ponsar | May 15, 1956 |
| 2,815,765 | Adelson | Dec. 10, 1957 |

FOREIGN PATENTS

| | | |
|---|---|---|
| 1,051,730 | France | Sept. 16, 1953 |

UNITED STATES PATENT OFFICE

CERTIFICATE OF CORRECTION

Patent No. 2,930,393                      March 29, 1960

Charles H. Starling

It is hereby certified that error appears in the printed specification of the above numbered patent requiring correction and that the said Letters Patent should read as corrected below.

Column 3, line 61, for "poperly" read -- properly --; column 5, line 37, after "controller" insert -- for maintaining a predetermined rate of flow despite variations in the upstream head, --; column 6, line 53, list of References Cited, under UNITED STATES PATENTS, for "Corts-Standford" read -- Cortis-Standford --.

Signed and sealed this 20th day of September 1960.

(SEAL)
Attest:

KARL H. AXLINE
Attesting Officer

ROBERT C. WATSON
Commissioner of Patents